(12) United States Patent
Curry et al.

(10) Patent No.: US 7,937,443 B2
(45) Date of Patent: May 3, 2011

(54) EMAIL MESSAGING PROGRAM WITH BUILT-IN VIDEO AND/OR AUDIO MEDIA RECORDING AND/OR PLAYBACK CAPABILITIES

(75) Inventors: Michael J. Curry, Jackson, CA (US);
Rudy D. Martin, Morgan Hill, CA (US);
Douglas Z. Pan, Milpitas, CA (US);
Richard T. Simoni, Jr., Cupertino, CA (US)

(73) Assignee: Talkway, Inc., Fremont, CA (US)

( * ) Notice: Subject to any disclaimer, the term of this patent is extended or adjusted under 35 U.S.C. 154(b) by 1077 days.

(21) Appl. No.: 09/683,995

(22) Filed: Mar. 10, 2002

(65) Prior Publication Data
US 2003/0172116 A1    Sep. 11, 2003

(51) Int. Cl.
*G06F 15/16* (2006.01)

(52) U.S. Cl. ......... 709/206; 709/220; 709/226; 709/229

(58) Field of Classification Search .................. 709/206, 709/216, 218, 223, 227, 230, 232, 208, 224, 709/217, 229, 220; 370/130; 707/10; 379/88.17, 379/205; 345/146
See application file for complete search history.

(56) References Cited

U.S. PATENT DOCUMENTS

| | | | | |
|---|---|---|---|---|
| 5,699,089 A | * | 12/1997 | Murray ........................ | 715/823 |
| 5,802,314 A | | 9/1998 | Tullis et al. | |
| 5,953,396 A | | 9/1999 | Kong | |
| 5,999,985 A | | 12/1999 | Sebestyen | |
| 6,014,688 A | | 1/2000 | Venkatraman et al. ....... | 709/206 |
| 6,014,689 A | | 1/2000 | Budge et al. ................. | 709/218 |
| 6,124,939 A | | 9/2000 | Toyoda et al. | |
| 6,131,121 A | * | 10/2000 | Mattaway et al. ............. | 709/227 |
| 6,185,184 B1 | * | 2/2001 | Mattaway et al. ............. | 370/230 |
| 6,212,551 B1 | | 4/2001 | Asghar et al. ................. | 709/206 |
| 6,223,213 B1 | | 4/2001 | Cleron et al. ................. | 709/203 |
| 6,233,318 B1 | * | 5/2001 | Picard et al. ................ | 379/88.17 |
| 6,252,588 B1 | | 6/2001 | Dawson ........................ | 345/252 |
| 6,253,231 B1 | | 6/2001 | Fujii .............................. | 709/206 |
| 6,360,252 B1 | | 3/2002 | Rudy et al. | |

(Continued)

FOREIGN PATENT DOCUMENTS
WO    WO-02/09437    1/2001
(Continued)

OTHER PUBLICATIONS

Yahoo! Messenger, http://messenger.yahoo.com, copyright 2002.
(Continued)

*Primary Examiner* — Khanh Q Dinh
(74) *Attorney, Agent, or Firm* — Michael Dryja

(57) ABSTRACT

An email messaging program with built in video and/or audio media recording and/or playback capabilities is disclosed. A system includes first and second clients, each having an email messaging program installed thereon. The user of the first client composes a message and records media. In a streaming media embodiment, the first client's messaging program uploads the media to a streaming media server, and sends the message to the user of the second client. In a file attachment embodiment, the messaging program attaches the recorded media to the message, and sends the message to the user of the second client. The second client's messaging program retrieves the message. In the streaming media embodiment, when the user of the second client views the message, the messaging program downloads the media from the streaming media server, and plays back the media. In the file attachment embodiment, the messaging program plays back the media.

24 Claims, 6 Drawing Sheets

U.S. PATENT DOCUMENTS

| | | | |
|---|---|---|---|
| 6,369,908 B1 | 4/2002 | Frey et al. | |
| 6,385,306 B1 | 5/2002 | Baxter, Jr. | |
| 6,389,467 B1* | 5/2002 | Eyal | 709/223 |
| 6,442,549 B1* | 8/2002 | Schneider | 707/10 |
| 6,484,199 B2* | 11/2002 | Eyal | 709/223 |
| 6,564,248 B1* | 5/2003 | Budge et al. | 709/206 |
| 6,731,323 B2* | 5/2004 | Doss et al. | 348/14.01 |
| 2001/0004743 A1 | 6/2001 | Krueger et al. | |
| 2001/0032246 A1 | 10/2001 | Fardella et al. | |
| 2001/0048676 A1 | 12/2001 | Jimenez et al. | |
| 2001/0052019 A1 | 12/2001 | Walters et al. | |
| 2002/0078466 A1 | 6/2002 | Beyda | |
| 2006/0209076 A1* | 9/2006 | Maeng | 345/473 |

FOREIGN PATENT DOCUMENTS

| | | |
|---|---|---|
| WO | WO-02/03284 | 1/2002 |
| WO | WO-02/44950 | 6/2002 |

OTHER PUBLICATIONS

Intel Email Postcard, http://www.intel.com/pccamera/software/send.htm, copyright 2002.

Kensington VideoCAMworks software, http://www.orbitnet.com/VideoCAMworks, 1999.

VideoLink Mail, http://www.smithmicro.com, copyright 2002.

IBM PC Pro Camera, http://www.ctdepot.com, undated.

VideoLink Pro, http://www.smithmicro.com, copyright 2002.

EyeBall Networks product datasheet, brochure, copyright 2001.

Click To Meet, http://www.cuseeme.com/products/clicktomeet.htm, copyright 2002.

Dwyco Video Conferencing System, http://www.dyco.com, copyright 1995-2001.

Microsoft NetMeeting, http://www.microsoft.com/windows/NetMeeting, last update Jun. 7, 1999.

Online Call, http://www.onlinecall.com, copyright 1996-2002.

VideoMail Studio, http://www.digitalmediaworks.com, 1998.

Picante, http://www.picantecorp.com, Jan. 2001.

MSN Messenger, http://messenger.msn.com, copyright 2002.

Ouhyoung et al., "The MOS Multimedia E-mail System," IEEE; 1994, pp. 315-324.

Markovic et al., "A MS-Window Software Tool for Multimedia E-mail in Local Area Network," IEEE, 1997, pp. 101-105.

Turner et al., "Continuous Media E-mail on the Internet: Infrastructure Inadequacies and a Sender-Side Solution," IEEE, 2000, pp. 30-37.

* cited by examiner

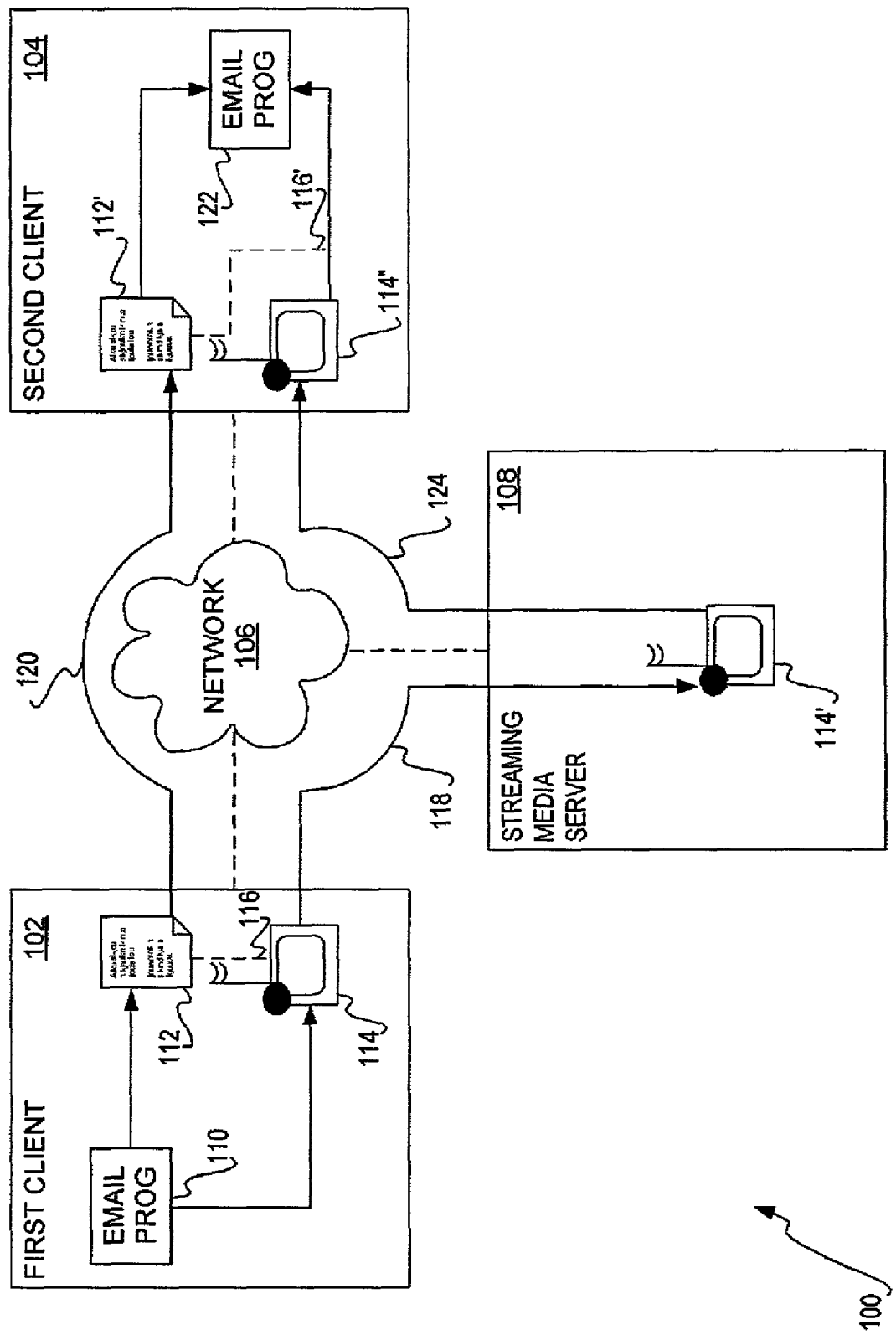

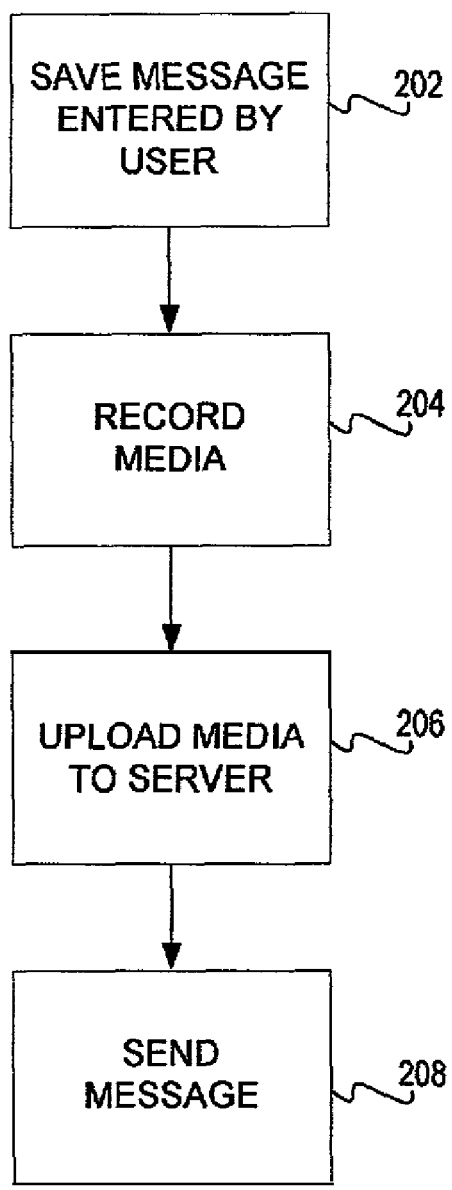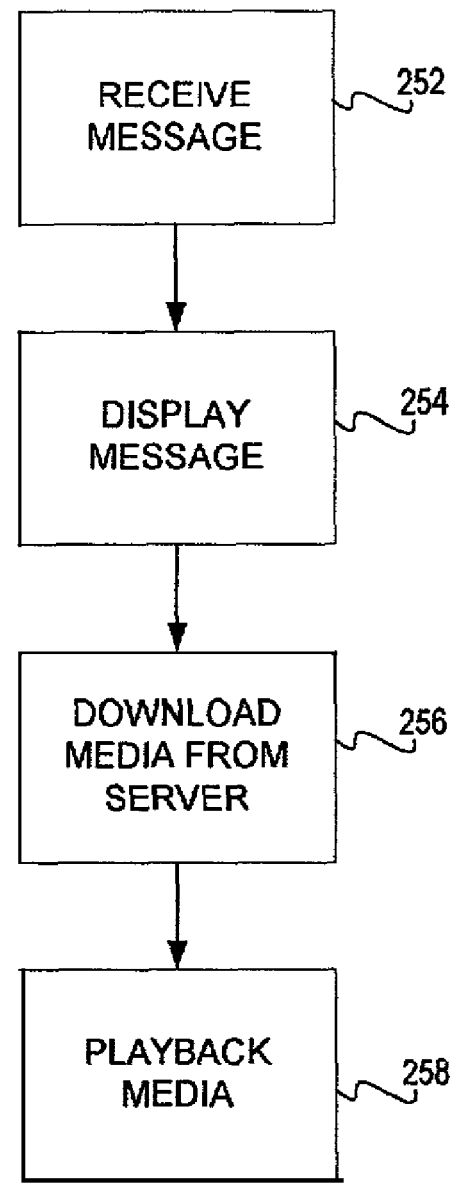

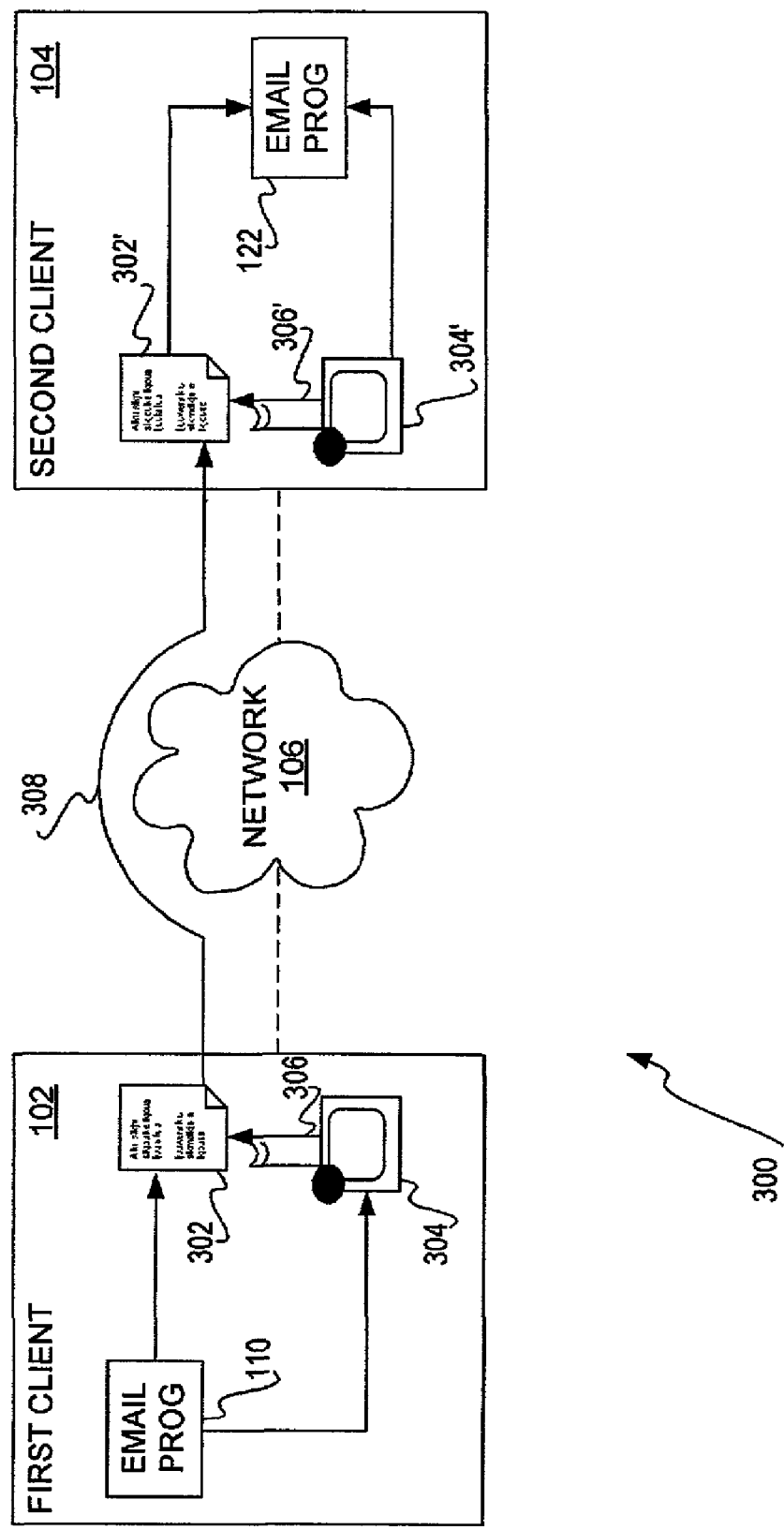

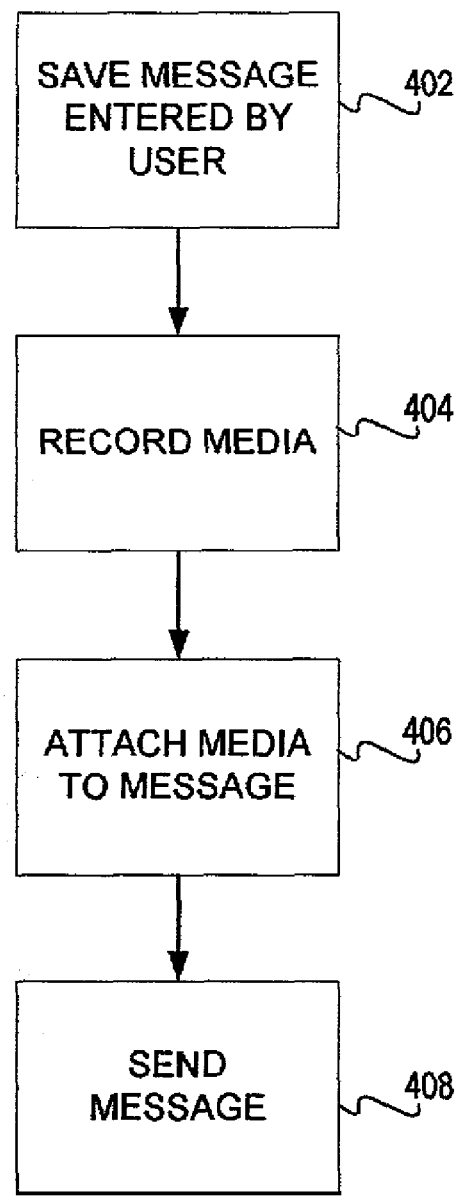
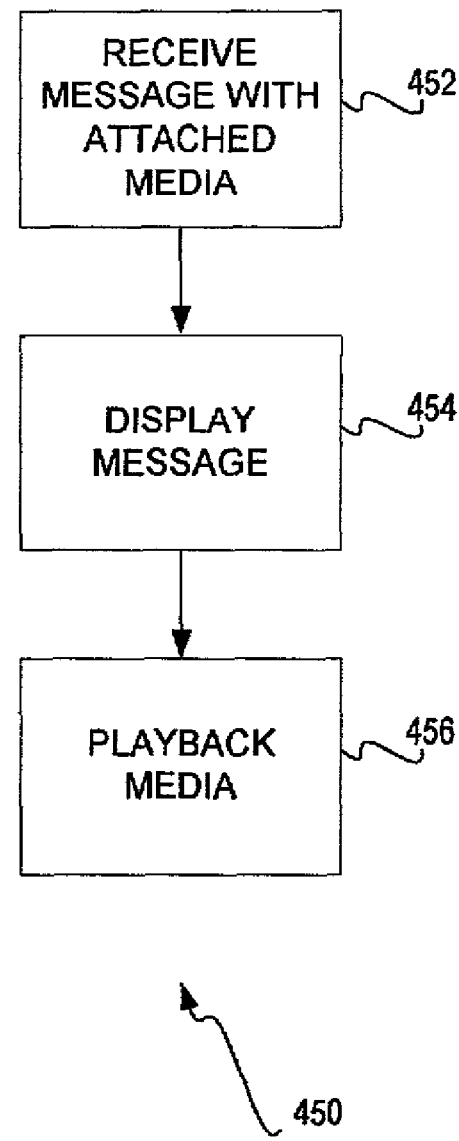

EMAIL MESSAGING PROGRAM WITH BUILT-IN VIDEO AND/OR AUDIO MEDIA RECORDING AND/OR PLAYBACK CAPABILITIES

BACKGROUND OF INVENTION

This invention relates generally to messaging programs, such as email messaging programs, and more particularly to such programs that have built-in video and/or audio media recording and/or playback capabilities.

The popularity of small video cameras for use with personal computers has been increasing. Such video cameras are sometimes referred to as netcams or webcams. Typically, they connect to the Universal Serial Bus (USB) or other port of a computer, and enable users to record or stream video and audio into the computer. Popular applications of such cameras include small-scale video conferencing, live transfer of video onto a web site, as well as other applications.

Unfortunately, using such cameras in connection with existing email messaging programs is generally not possible. An email messaging program is defined herein as a program that can both send and receive email. Such a program is typically, but not necessarily, able to accommodate email according to a given standard, such as the Post Office Protocol (POP), or the Internet Messaging Access Protocol (IMAP). Such programs include versions of Microsoft Outlook, available from Microsoft Corp., of Redmond, Wash., as well as versions of America Online (AOL), available from AOL Time Warner, of New York, N.Y.

A user wishing to send video or audio media with such an existing email messaging program has only limited options. The user can record the video or audio media with another program, completely separate from the email messaging program, and then attach the recorded media as a file attachment to an email message within the email messaging program. This approach, however, is disadvantageous. It requires the user to go outside the email messaging program to perform video or audio media recording capability. Furthermore, especially in the case of video, the resulting recorded media may have a large file size. However, many Internet Service Providers (ISP's) restrict the size of email messages.

Even if the user is able to send the recorded video or audio with his or her ISP, the recipient's ISP may still reject the email message as too large. Besides individual email message size limits, another constraint imposed by many ISP's and email providers, especially web-based email providers such as Hotmail, run by Microsoft Corp., is a limit on total email mailbox size. An email provider may thus also reject an email message that has recorded audio or video because receiving it would cause the recipient to exceed his or her allowed total email mailbox size.

The user may also record video or audio media and upload the resulting file to an Internet web site, such as by using the File Transfer Protocol (FTP). In this case, the user provides the recipient of the email message with instructions as to how to download the media. Certain web sites also host such video or audio media for this purpose. However, in either situation, the user still must inconveniently perform some manual steps in order to upload the media to the web site. The recipient is similarly inconvenienced, having to navigate a perhaps unfamiliar web site in order to retrieve the media.

For these and other reasons, therefore, there is a need for the present invention.

SUMMARY OF INVENTION

The invention relates to an email messaging program with built in video and/or audio media recording and/or playback capabilities. A system includes a first client and a second client, each having an email messaging program installed thereon. The user of the first client composes a message and records media. In a streaming media embodiment, the email messaging program of the first client uploads the media to a streaming media server, and sends the message to the user of the second client. In a file attachment embodiment, the email messaging program of the first client attaches the recorded media to the message, and sends the message to the user of the second client.

The email messaging program of the second client retrieves the message. In the streaming media embodiment, when the user of the second client views the message, the email messaging program of the second client downloads the media from the streaming media server, and plays back the media for the user of the second client. In the file attachment embodiment, when the user of the second client views the message, the email messaging program plays back the media as attached to the message for the user of the second client.

Embodiments of the invention provide for advantages over the prior art. The email messaging program of the invention has built-in video and/or audio media recording and/or playback capabilities. As a result, a user of the email messaging program does not have to exit the program, and access a separate program, in order to take advantage of such capabilities. Furthermore, in the streaming media embodiment, the recorded media does not actually reside within or as an attachment to an email message. Therefore, email messages sent by and received with an email messaging program according to such an embodiment will not typically exceed individual email size and total email mailbox size limitations.

Having built-in audio and/or video recording in particular is advantageous for other reasons as well. A user can send email with recorded media using his or her everyday email messaging program, without having to resort to another program. Thus, the user can use the address book typically found in such a program to select recipients of the email, and can easily forward received messages that have video. The user can use the auto-signature option typically found in such a program to automatically append signatures to sent and forwarded messages with video. Such features are not available with separate email messaging and media programs. The user may also use audio and/or video when replying to a received email message, which is particularly useful in smaller-sized devices, such as personal digital assistant (PDA) devices and cellular phones, that lack full-sized keyboards on which to enter a text reply. Furthermore, having built-in audio and/or video playback allows the user to easily replay recorded messages that were received and that contain video.

Still other aspects, advantages, and embodiments of the invention will become apparent by reading the detailed description that follows and by referring to the accompanying drawings.

BRIEF DESCRIPTION OF DRAWINGS

FIG. 1 is a diagram of a system according to a streaming media embodiment of the invention.

FIG. 2A is a flowchart of a method for sending an email message having associated streaming media, according to a streaming media embodiment of the invention.

FIG. 2B is a flowchart of a method for receiving an email message having associated streaming media, according to a streaming media embodiment of the invention.

FIG. 3 is a diagram of a system according to a file attachment embodiment of the invention.

FIG. 4A is a flowchart of a method for sending an email message having media attached thereto, according to a file attachment embodiment of the invention.

FIG. 4B is a flowchart of a method for receiving an email message having media attached thereto, according to a file attachment embodiment of the invention.

DETAILED DESCRIPTION

Figure 5:
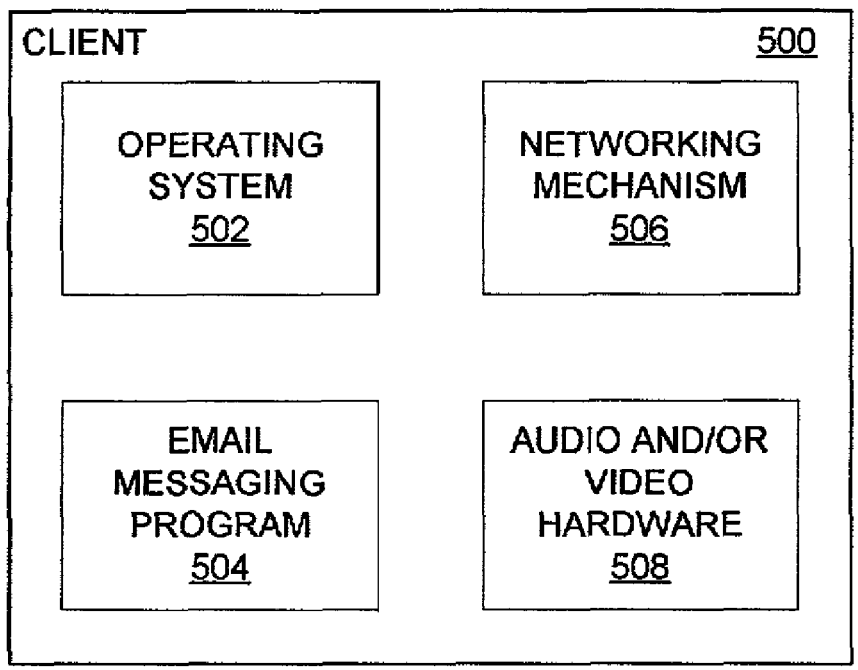
FIG. 5 is a diagram of a client device, according to an embodiment of the invention.

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Streaming Media Embodiment

FIG. 1 shows a system 100 according to a streaming media embodiment of the invention. The system 100 includes a first client 102 and a second client 104. Each of the clients 102 and 104 is generally a platform on which programs can be run, and is distinguished from the term client as can alternatively be used to describe a computer program such as an email messaging program. The clients 102 and 104 are communicatively coupled to a network 106. The network 106 may be one or more of the Internet, an intranet, an extranet, a local-area network (LAN), a wide-area network (WAN), a telephony network like the public switched telephone network (PSTN), the Integrated Services Digital Network (ISDN), cellular or other types of wireless telephony networks, and so on.

The first client 102 has running thereon an email messaging program 110. The email messaging program 110 allows a user of the first client 102 to perform functionality related to email messages. Such functionality includes composing and sending emails, receiving emails, replying to emails, forwarding emails, and so on.

The email messaging program 100 also has built-in audio and/or video playback and/or recording capabilities. The phrase audio and/or video is inclusive of both audio and video, as well as audio only and video only. More generally, the phrase audio and/or video is referred to as media, such as multimedia.

The term recording as used herein is used in a general and all-encompassing sense. The term can mean storing audio and/or video for playback at a later time. It can also mean the capture, and/or encoding (such as compressing), and/or transmitting of such media. Thus, the media might be played back immediately, or played back later. That is, the persistent storage of the media does not have to occur to fall within the term recording as used herein. Similarly, the term playing back can include the playing back of previously stored media, as well as playing back live media.

On the first client 102, the user uses the email messaging program 110 to compose an email message 112, as well as to record media 114 that is associated with the email message 112, as indicated by the dotted line 116. The email message 112 typically includes text, and may only include text. Alternatively, the email message 12 may include images as well as text, formatted in accordance with a markup language, such as the HyperText Markup Language (HTML). As the media 114 is recorded, or after the media 114 is recorded, it is streamed, or uploaded, to a streaming media server 108 also communicatively coupled to the network 106. This is indicated by the line 118. The media 114 is stored at the streaming media server 108 as the media 114'.

The email message 112 is sent by the email messaging program 110 through the network 106 for ultimate receipt by the email messaging program 122 of the second client 104, as the email message 112'. This is indicated by the line 120. The email messaging programs 110 and 122 may be compatible with email standards such as the Post Office Protocol (POP), the Internet Messaging Access Protocol (IMAP), and/or other standards, or they may be proprietary in nature. Typically, the email message 112 is received by an email server (not shown in FIG. 1), from which the email messaging program 122 downloads the email message 112, as the email message 112'. Alternatively, the email message can be accessed over the Internet, using a web-based email messaging program.

The user of the second client 104 may at some point open the email message 112' using the email messaging program 122, or otherwise request that the email messaging program 122 display the email message 112' for viewing. At this time, the email messaging program 122 automatically or upon the user's command downloads or streams the media 114' from the streaming media server 108, over the network 106, as the media 114". This is because the media 114" is associated with the email message 112', as indicated by the dotted line 116'. The email messaging program 122 may first download the entirety of the media 114" before playing it back to the user of the second client 104, as indicated by the line 124, or may play the media 114" as it is downloaded, which is known as streaming.

The system 100 has been described as the email messaging program 110 of the first client 102 sending a composed email message 112, and the email messaging program 122 of the second client 104 receiving the email message 112'. However, both email messaging programs 110 and 122 typically have both sending and receiving capabilities. That is, the email messaging program 122 of the second client 104 may also allow the user of the second client 104 to compose an email message and record associated media, and the email messaging program 110 of the first client 102 may also allow the user of the first client 102 to receive an email message and play back associated media.

FIG. 2A shows a method 200 that outlines the basic process followed by an email messaging program according to a streaming embodiment of the invention to send an email message having associated media. First, a message entered by the user of the client on which the email messaging program runs is saved by the email messaging program (202). The term saving is used herein in a general sense. The email messaging program may save the message to persistent storage, such as a hard disk drive, or keep it in volatile memory. Concurrently, after, or before the entering and saving of this email message, media is recorded (204). As previously indicated, the media may include audio, video, or both audio and video. As the media is recorded, or after it has been entirely recorded, the media is uploaded to a streaming media server over a network (206). The email message is sent over the network to its recipient, with a link or other entity indicating that the message has associated media that has been uploaded to the server (208). It is noted that the steps and/or acts indicated as the method 200 may be performed in orders other than that indicated in FIG. 2A, as is the case for other methods of other embodiments of the invention. For instance, the email message may initially be sent, and then the recorded media may be uploaded.

FIG. 2B shows a method 250 that outlines the basic process followed by an email messaging program according to a streaming embodiment of the invention to receive an email having associated media. A message is received over a network (252). In response to a user requesting the email messaging program to display the message, the email message is displayed (254). This request can be on a per-message basis, such as by the user selecting the particular email message, or on a default basis. For instance, the email messaging program may have a preview pane in which messages are automatically displayed. The email messaging program downloads the associated media from the streaming media server that has been previously uploaded to the server (256), and plays back this media (258). Playback may be performed as the media is being downloaded from the server, or after the media has been downloaded from the server in its entirety.

Playback can be performed in a number of different manners, and is not limited to integration with the email messaging program, although having the email messaging program have code for media playback is within the confines of the invention. For instance, a web-based email messaging program can be used, which is not installed on the user's computer. As another example, the user may be using an installed email messaging program, but the code that actually plays back the media may not be part of the program itself. The playback may be accomplished by a subsidiary program, such as a Java applet that has tags embedded in an HTML email message, and the code of which is downloaded in real-time and executed when the email messaging program renders the HTML message. Other such players can also be embedded into the HTML message, such as the Apple QuickTime player, available from Apple Computer of Cupertino, Calif., and the Microsoft Windows Media Player, available from Microsoft Corp. Furthermore, in some instances, an HTML email message or a text email message may contain a Universal Resource Locator (URL) link therein that the user must explicitly select to launch a web browser window to display a page including a media player.

File Attachment Embodiment

FIG. 3 shows a system 300 according to a file attachment embodiment of the invention. The system 300 includes the first client 102 and the second client 104, as before, and both the clients 102 and 104 are communicatively coupled to the network 106, also as before. The first client 102 has running thereon the email messaging program 110. The email messaging program 110 allows the user of the first client 102 to perform functionality related to email messages, and also has built-in audio and/or video playback and/or recording capabilities.

On the first client 102, the users uses the email messaging program 110 to compose an email message 302, as well as to record media 304 that is associated with the email message 302. After the media 304 has been recorded, it is saved as a file and attached as a file attachment to the email message 302, as indicated by the line 306. The email message 302, with the media 304 as a file attachment, is sent by the email messaging program 110 through the network 106 for ultimate receipt by the email messaging program 122 of the second client 104, as indicated by the line 308. The email message 302 having the media 304 attached as a file attachment is received at the second client 104 as the email message 302' having the media 304' as a file attachment, the latter indicated by the line 306'.

When the user of the second client 104 opens the email message 302', or otherwise requests that the email messaging program 122 display the email message 302' for viewing, the email messaging program 122 plays back the media 304' associated with the email message 302'. The email messaging program 122 may automatically recognize that the file attachment to the email message 302' is a media file, such as audio and/or video, and playback the media. Thus, the email messaging program 122 also has built-in audio and/or video capabilities. Furthermore, playback may be accomplished in alternative manners, as has been described. In the case of a file attachment, opening the attachment in the email messaging program may launch a separate viewing program associated with the file attachment for playing back the media.

As before, whereas the system 300 has been described as the email messaging program 110 of the first client 102 performing the media recording and message sending, and the email messaging program 122 of the second client performing the media playback and message receiving, either program 110 or 122 may perform either of these functionalities. The primary difference between the system 100 of FIG. 1 and the system 300 of FIG. 3 is that the email messages sent and received within the system 100 do not include media, but rather links to media on a streaming media server, whereas the email messages sent and received within the system 300 include media as file attachments. As such, the system 100 uses an intermediary streaming media server to at least temporarily store the media, whereas the system 300 does not use an intermediary streaming media server.

FIG. 4A shows a method 400 that outlines the basic process followed by an email messaging program according to a file attachment embodiment of the invention to send an email message having associated media. First, a message entered by the user of the client on which the email messaging program runs is saved by the email messaging program (402), where the term save is used in a general sense, as has been described. Concurrently, after, or before the entering and saving of this email message, media is recorded (404). Once the media has been recorded, it is attached as a file attachment to the email message (406). The email message is finally sent over a network to its recipient (408).

FIG. 4B shows a method 450 that outlines the basic process followed by an email messaging program according to a file attachment embodiment of the invention to receive an email having associated media. First, a message is received over a network (452), where the message has media attached thereto as a file attachment. In response to a user requesting the email messaging program to display the message, the email message is displayed (454). The media that is attached to the email message as a file attachment is then played back (456).

Client with Email Program Having Built-in Media Recording and/or Playback Capability FIG. 5 shows an example client device 500 according to an embodiment of the invention. The client device 500 may implement one or both of the clients 102 and 104 of FIG. 1. The client device 500 can be a desktop or a laptop computer, as well as other types of computerized devices. Such computerized devices may include personal digital assistant (PDA) devices, cellular and other types of wireless phones, add-on devices to displays known as set-top boxes, and so on. The client device 500 typically but not necessarily includes an operating system (OS) 502, an email messaging program 504, a network mechanism 506, and audio and/or video hardware 508. For instance, cellular phones and other types of wireless phones in particular may not have an integrated OS. The client device 500 may also include other software, hardware, mechanisms, components, and so on.

When it is present, the OS 502 is the master control program that runs the computer. It is usually the first program loaded when the computer is turned on, and its main part, the "kernel," resides in memory at all times. The OS 502 typically sets the standards for all programs that run on the computer. The email messaging programs 504 may communicate with the OS 502 for user interface and file management operations. Examples of the OS 502 include versions of the Microsoft Windows OS, available from Microsoft Corp., versions of the Apple Macintosh OS, available from Apple Computer, Inc., of Cupertino, Calif., versions of the Linux OS, versions of the UNIX OS, and so on.

The email messaging program 504 allows a user to perform email message-related functionality, as has been described. Furthermore, the email messaging program 504 includes built-in audio and/or video recording and/or playback capability, as has also been described. The email messaging program 504 runs or in conjunction with the OS 502. The networking mechanism 506 allows the client device 500 to communicatively couple to a network. The mechanism 506 may be one or more of an analog modem, an ISDN adapter, a network adapter card, such as an Ethernet card, a network adapter chipset, and so on. The mechanism 506 may also be one or more of a cable modem, a Digital Subscriber Loop (DSL) modem, a digital modem, and a wireless modem. The audio and/or video hardware 508 can include both recording and playback hardware. Such hardware may include speakers, microphones, display devices, and video cameras. The video camera may be a web cam, a net cam, a digital video (DV) cam with a FireWire (IEEE-1394) or other interface, a Hi-8 cam with an S-video or other type of interface, and so on.

Figure 6:
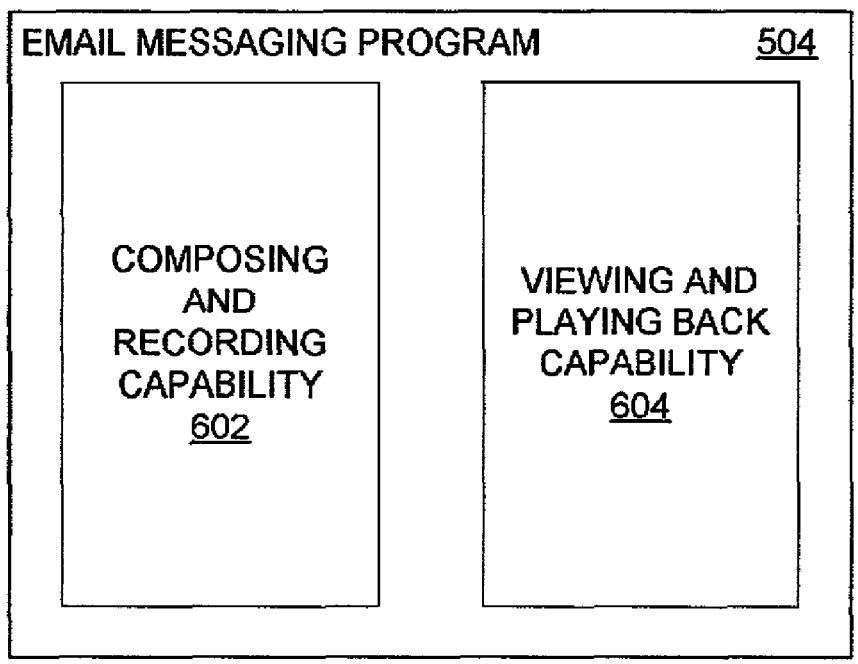
FIG. 6 is a diagram of an email messaging program, according to an embodiment of the invention.

FIG. 6 shows the email messaging program 504 in more detail, according to an embodiment of the invention. The program 504 includes composing and recording capability 602, and optionally may include built-in viewing and playing back capability 604. Each of these capabilities may be implemented as a software and/or hardware mechanism, component, module, and so on, and each may be considered the means to perform its respective functionality. Other components and capabilities may be included in the program 504. Furthermore, the capabilities 602 and 604 may be programmed in a different manner than that shown in FIG. 6. For instance, the message composing and viewing capability may be programmed as a component separate from the component as which the media recording and playback capability is programmed.

The composing and recording capability 602 allows a user to compose a message and record media associated with the message, to send to a user over a network via a networking mechanism. The media may be associated with the message as streaming media, a media attached as a file attachment to the message, or in another manner. The viewing and playback capability 604 allows a user to view a message received over a network via a networking mechanism, and play back media associated with the message.

The email messaging program 504 can be programmed in a variety of different computer programming languages. In one embodiment, the program 504 is programmed in a traditional programming language such as C or C++, or a language such as Java or C#. The media playback and recording capabilities may be implemented in one embodiment by embedding one or more media controls consistent with the mark-up language, such as an ActiveX control or Java applet in the case of HTML, as part of the program 504, or as part of the email message itself.

Figure 7:
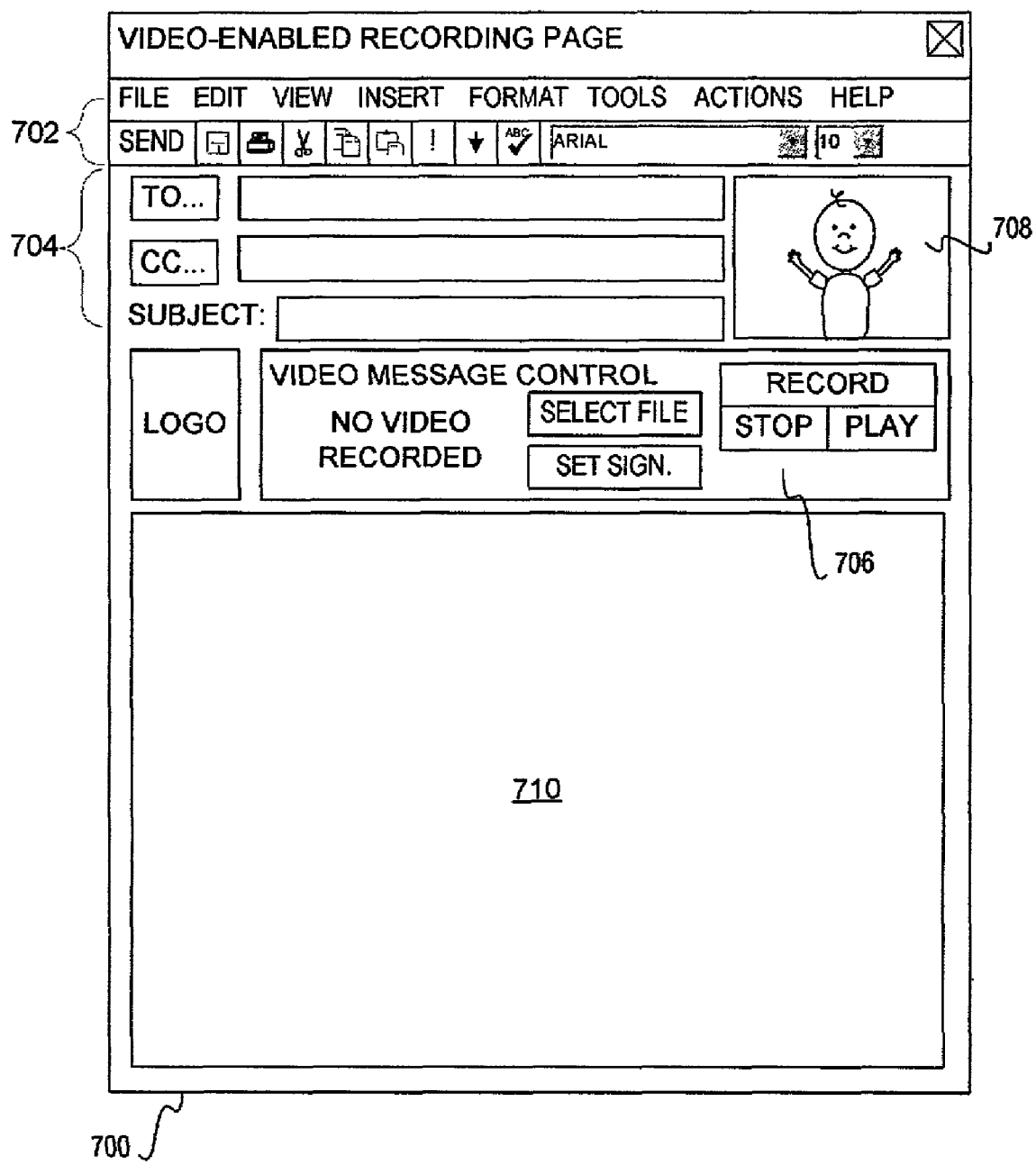
FIG. 7 is a diagram showing an example screenshot of how an email messaging program with built-in audio and/or video recording and/or playback capabilities may appear to the user, according to an example embodiment of the invention.

FIG. 7 shows an example screenshot of how an email messaging program with built-in media recording capability may appear to the user, according to an embodiment of the invention. The window 700 is created by the email messaging program, and includes email functionality, such as menu items and toolbar buttons 702, to, cc, and subject lines 704, and a message text entry area 710. The program also presents audio or video controls 706 into the window 700, as well as a video viewing area 708. Therefore, the user can record video in the same program as he or she composes and sends email messages.

Conclusion

It is noted that, although specific embodiments have been illustrated and described herein, it will be appreciated by those of ordinary skill in the art that any arrangement is calculated to achieve the same purpose may be substituted for the specific embodiments shown. This application is intended to cover any adaptations or variations of the present invention. Therefore, it is manifestly intended that this invention be limited only by the claims and equivalents thereof.

The invention claimed is:

1. A system comprising:
    a network;
    a first client having a first email messaging program installed thereon, a composing user composing a message on the first email messaging program, the composing user recording media on the first email messaging program, the first email messaging program sending the message and the media to a receiving user over the network; and,
    a second client having a second email messaging program installed thereon on which the receiving user receives the message over the network, the second email messaging program playing back the media upon the user viewing the message,
    wherein the first email messaging program sends the message and the media over the network by itself, without having to use any other email messaging program on the first client.

2. The system of claim 1, further comprising a streaming media server, the first email messaging program uploading the media to the streaming media server upon the message being sent to the receiving user over the network, and the second email messaging program downloading the media from the streaming media server over the network upon the receiving user viewing the message.

3. The system of claim 1, wherein the first email messaging program attaches the media as an attachment to the message upon the message being sent to the receiving user over the network, and the second email messaging program receives the media as the attachment to the message over the network.

4. The system of claim 1, wherein the network comprises at least one of: the Internet, an intranet, an extranet, a local-area network (LAN), a wide-area network (WAN), a wired network, a wireless network, and a telephony network.

5. The system of claim 1, wherein each of at least one of the first client and the second client comprises: a desktop computer, a laptop computer, a cellular phone, a wireless phone, a set-top box, and a personal digital assistant (PDA) device.

6. The system of claim 1, wherein the message comprises at least text.

7. The system of claim 1, wherein the media comprises at least one of: audio, video, streaming audio, and streaming video.

8. A system comprising:
    a networking mechanism communicatively coupling the system to a network; and, an email messaging program having at least a composing capability for a user to compose a message and record media associated with the message to send to another user over the network via the networking mechanism,
wherein the user composes the message on the email messaging program, and the user records the media on the email messaging program, and
wherein the email messaging program sends the message and the media over the network by itself, without having to use any other email messaging program on the system.

9. The system of claim 8, further comprising an operating system on which the email messaging program runs.

10. The system of claim 8, wherein the composing capability uploads the media to a streaming media server communicatively coupled to the network over the network via the networking mechanism upon the message being sent to the other user over the network via the networking mechanism.

11. The system of claim 8, wherein the composing capability attaches the media as an attachment to the message upon the message being sent to the other user over the network.

12. The system of claim 8, wherein the email messaging program further has a playback capability for the user to view messages received from other users over the network via the networking mechanism and play back received media associated with the messages received.

13. The system of claim 12, wherein the playback capability downloads the media associated with one of the messages received from the streaming media server over the network via the networking mechanism upon the user viewing the one of the messages received.

14. The system of claim 12, wherein the playback capability receives the media associated with one of the messages as an attachment to the one of the messages received over the network.

15. The system of claim 8, wherein the networking mechanism comprises at least one of: an analog modem, an Integrated Services Digital Network (ISDN) adapter, a network adapter card, a network adapter chipset, a cable modem, a Digital Subscriber Loop (DSL) modem, a digital modem, and a wireless modem.

16. The system of claim 8, wherein the message comprises at least text.

17. The system of claim 8, wherein the media comprises at least one of: audio, video, streaming audio, and streaming video.

18. A method comprising:
saving a message entered by a user by an email messaging program of a system;
recording media associated with the message by the email messaging program;
uploading the media to a streaming media server over a network by the email messaging program; and,
sending the message over the network by the email messaging program,
wherein the user composes the message on the email messaging program and the user records the media on the email messaging program, and
wherein the email message program sends the message and the media over the network by itself, without having to use any other messaging program on the system.

19. The method of claim 18, further comprising:
receiving a second message over the network by the email messaging program;
in response to a user requesting the email messaging program to display the second message,
displaying the second message by the email messaging program;
downloading second media associated with the message from the streaming media server over the network by the email messaging program; and,
playing back the second media by the email messaging program.

20. A method comprising:
saving a message entered by a user by an email messaging program of a system;
recording media associated with the message by the email messaging program;
attaching the media to the message by the email messaging program; and,
sending the message over a network by the email messaging program,
wherein the user composes the message on the email messaging program, and the user records the media on the email messaging program,
wherein the first email mesa in program sends the message and the media over the network by itself, without having to use any other email messaging program on the system.

21. The method of claim 20, further comprising:
receiving a second message having attached thereto second media over the network by the email messaging program;
in response to the user requesting the email messaging program to display the second message,
displaying the second message by the email messaging program; and,
playing back the second media by the email messaging program.

22. A computer-readable medium having instructions stored thereon for an email messaging program of a system, the email messaging program comprising:
means for composing a first message by a first user and for recording first media associated with the first message to send to a second user over a network; and,
means for viewing a second message received from the second user over the network by the first user, and for playing back second media associated with the second message,
wherein the first user composes the first message on the email messaging program, and the first user records the first media on the email messaging program, and
wherein the email messaging program sends the first message and the media over the network by itself, without having to use any other email messaging program on the system.

23. The medium of claim 22, wherein the means for composing and for recording uploads the first media to a streaming media server communicatively coupled to the network over the network upon the first message being sent to the second user over the network, and the means for viewing and for playing back downloads the second media from the streaming media server over the network upon the first user viewing the second message.

24. The medium of claim 22, wherein the means for composing and for recording attaches the first media as an attachment to the first message upon the first message being sent to the second user over the network, and the means for viewing and for playing back receives the second media as an attachment to the second message over the network.

* * * * *